Dec. 24, 1957   J. HALAHAN ET AL   2,817,267
FILM COOLING APPARATUS FOR FILM PROJECTORS
Filed March 23, 1953   2 Sheets-Sheet 1
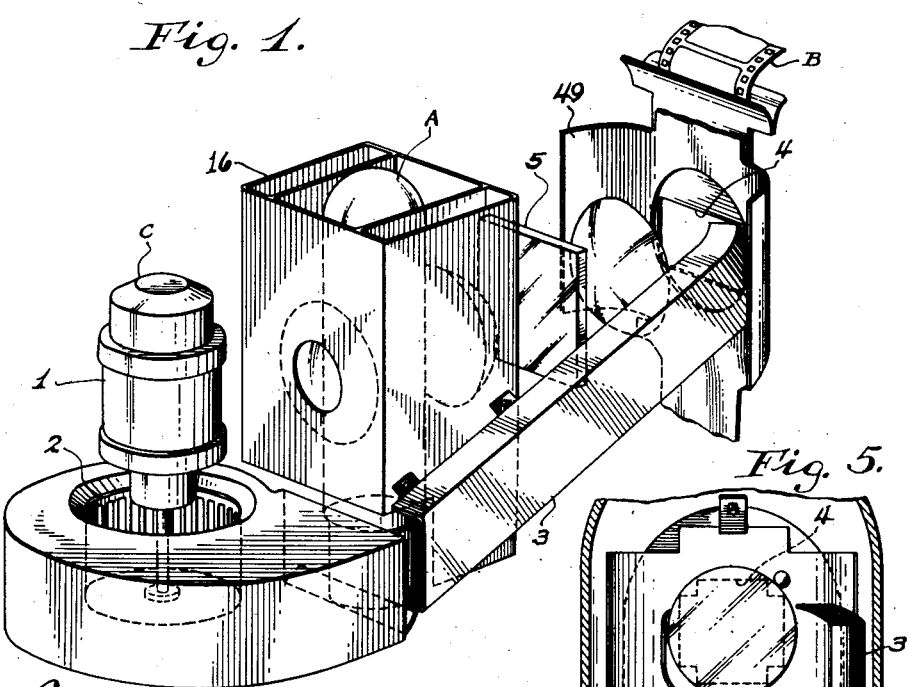
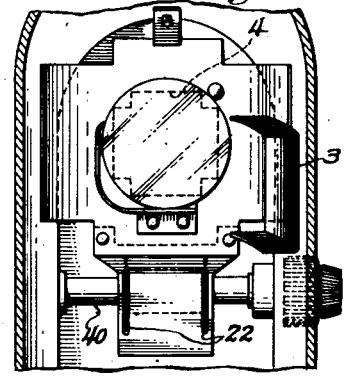
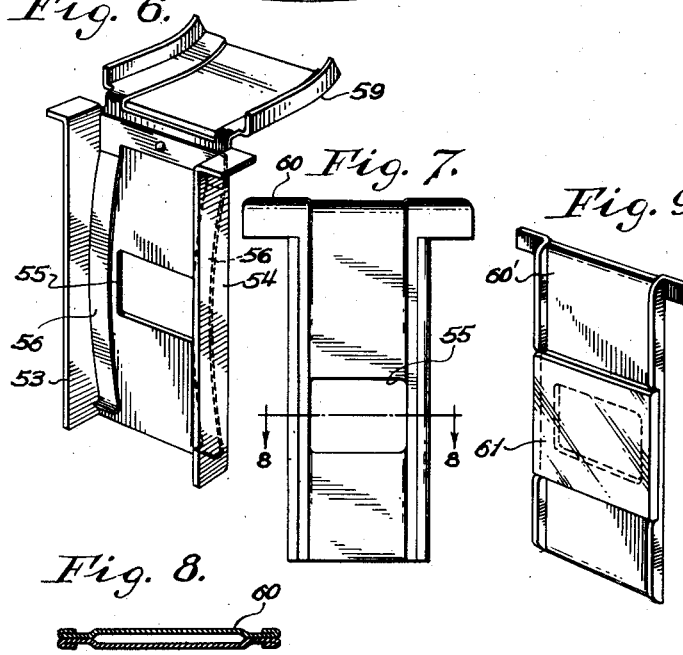
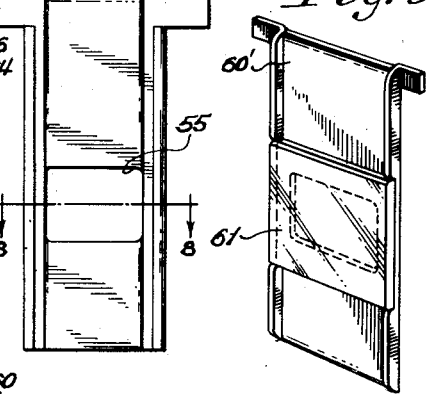
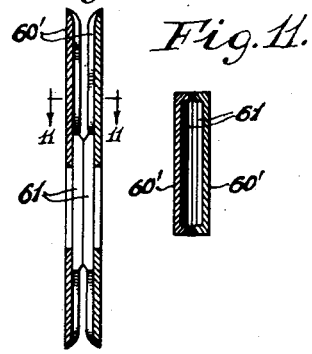
INVENTORS
JOHN HALAHAN
THEODORE F. ARONSON
FLOYD A. LYON
BY
John C. McGregor
ATTORNEY

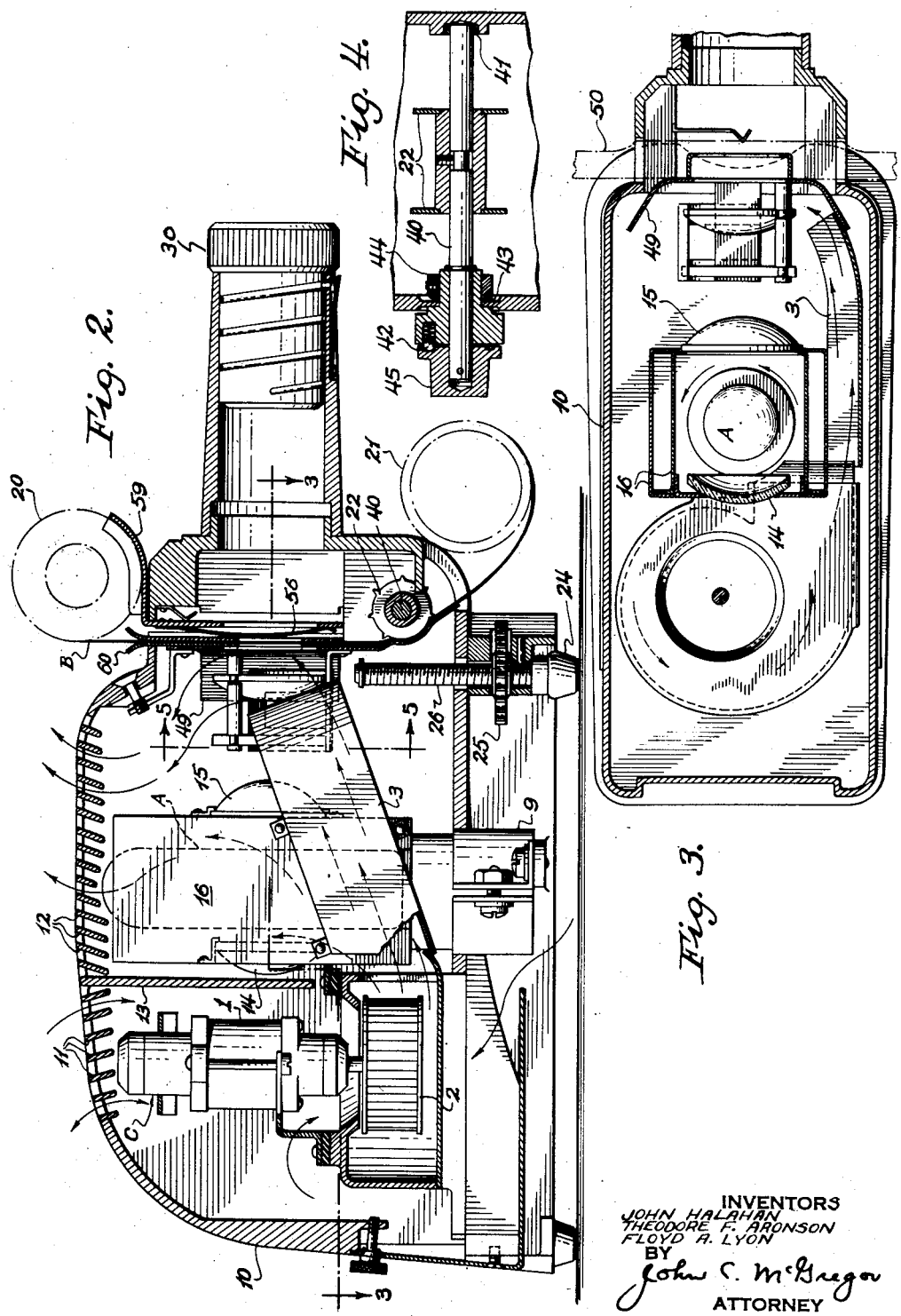

2,817,267

FILM COOLING APPARATUS FOR FILM PROJECTORS

John Halahan, Brookville, Theodore F. Aronson, Valley Stream, and Floyd A. Lyon, Brookville, N. Y., assignors, by mesne assignments, to The Kalart Company Inc., Plainville, Conn., a corporation of New York Application March 23, 1953, Serial No. 343,972

4 Claims. (Cl. 88—24)

This invention relates to strip film projectors and more particularly to such apparatus having new and improved film cooling means.

Film projectors of the type using strip film are generally used in conjunction with lectures, in order to project illustrations and other material illustrative of the lecture on the screen. The general procedure is to insert one frame at a time and discuss each individual illustration. Therefore, the film is in front of the light in a stationary position for a fairly long length of time, unlike a movie projector.

These projectors are generally run very hot and there is a great deal of heat generated in the film due to the temperature of the projector and also due to the absorption of the radiation energy from the projector light by the film. In many cases, this heat is so intense that it causes the film to curl up and even to ignite. Many conventional film projectors protect the film and restrain it from buckling by having spring loaded glass plates keep the film flat. This insulates the film somewhat from the convection heat from the light but does not save the film from the radiation heat which passes through the glass.

In conventional projectors, there is generally an attempt made to cool the entire projector, for instance, by providing the outer case with ribs or fins or by inserting a fan in such a position to cool the projector lamp.

The present invention takes an entirely different approach to the cooling problem. In the present invention, there is a standard arrangement made to cool the projector or the projector lamp and in addition, a cooling air blast is provided directly on the film so that the cooling medium is directed to the film where it will do the most good. It is not possible to cool the entire projector without the use of very large cooling apparatus and there is no great purpose in cooling the entire projector in any event, since the primary damage is done to the film such as curling, scorching or igniting.

Another disadvantage of conventional projectors is that the glass pressure plates on the film quite often becomes dusty and interfere with the quality of the projector picture. Quite often also this dust will scratch and damage the film due to the fact that there is pressure between the glass and the film. The present invention provides an air blast directly on the film so that the film is cooled sufficiently so that this glass may be eliminated entirely in most applications thereby eliminating the problem of dust and its effects on the quality of projection and on the film.

Accordingly it is a principal object of the present invention to provide new and improved strip film projector film apparatus.

Another object of the present invention is to provide new and improved cooling apparatus for film projectors.

Another object of the present invention is to provide new and improved cooling apparatus for stationary film projectors comprising means to cause an air blast on the film to thereby cool the film.

Another object of the present invention is to provide new and improved means to eliminate the use of glass pressure plates on the film.

Another object is to eliminate pressure plates and provide air blast cooling on the film.

Another object is to provide film cooling means in addition to conventional projector cooling means.

These and other objects of the invention will be apparent from the following specification and figures of which:

Figure 1 is an isometric view of the principal components of the present invention, Figure 2 is a side sectional view of a projector according to the present invention, Figure 3 is a sectional plan view of the projector of Figure 2, Figure 4 is a sectional view of film moving apparatus, Figure 5 is a detailed view of the front of the projector adjacent which the film passes, Figure 6 is a detail view of the film guide into which the pressure plates are inserted, Figure 7 is a view of the pressure plates without glass inserts, Figure 8 is a sectional view of Figure 7, Figure 9 is a view of a pressure plate with glass inserts, Figure 10 is a sectional view of two pressure plates with glass inserts, Figure 11 is a sectional view of Figure 10.

Figure 1 is an isometric view of the principal components of the projector. The projector light is shown at A, the film at B, and the cooling motor at C. The cooling motor 1 turns a turbine system 2 which draws in air from outside the case and forces the air along the rectangular duct 3 which causes the air blast to impinge on the film passing through the light beam opening 4. A glass 5 may be interposed between the light A and the film. Note that part of the air blast from the turbine is directed inside the ducts and shields 16 surrounding the projector lamp to cool it. The remainder of the air blast is directed around the case and directly impinges on the film being projected. The primary purpose of the present invention is to cause the cooling air to beat directly upon the film where it will do the most good in preventing film buckles which would cause out of focus conditions and damage to the film.

Figure 2 shows a cross-sectional view of the projector having the same general arrangement as shown in Figure 1. The casing 10 of the projector is vented at the top and has a number of fins 11, 12 etc. The fins 11 are slanted to draw air in from the back of the projector as well as from the bottom, and the fins 12 are slanted to eject the hot air forwardly so that it will not be drawn in again. The direction of the air is shown by the arrows. Most of the air is drawn in from the bottom and the back top fins 11.

The projector light A is located at the center of the projector in socket 9 and is separated from the cooling motor by the wall 13. The light from the projector lamp A is reflected by the reflector 14 and directed through the lens 15 on to the film B whence the image is projected into space, through the adjustable lens 30.

The film is moved from the top reel 20 to the bottom reel 21 by means of film advancing apparatus driving the film sprockets 22. Suitable film advancing apparatus is shown in Figure 4 and such apparatus is discussed more fully in my copending application filed March 23, 1953, Serial Number 343,971, entitled Film Advancing Apparatus.

My copending application particularly describes film advancing apparatus which is adapted to be remotely or automatically operated. However, conventional film advancing apparatus may be used in the present invention. The front leg 24 of the projector may be adjusted by means of the adjustment wheel 25 which engages the screw portion 26 of the leg 24. This provides means for adjusting the angle of projection with respect to the table or desk upon which the projector is set.

The operation of the cooling system will be described in connection with Figure 3 which is a section view of the projector along the line 3—3 of Figure 2. The cooling motor 1 operates a turbine 2 which moves the air from outside the casing in the direction of the arrows along a conduit 3 which causes the air to flow along the side of the projector casing and directs the air directly upon the film at B as it passes in front of the lens system. The air then strikes the deflector 49 whence it passes backward and up and passes out the top of the casing through the fins 12, Figure 2. Note part of the air blast from turbine is directed up through the shields 16 surrounding the lamp to provide cooling for the lamp.

Figure 4 shows a view of a typical film advancing mechanism. It generally comprises a main shaft 40 upon which the film sprockets 22 are mounted. The shaft 40 is suitably mounted in the casing for instance by the bushing 41 at one end and suitable bearings at the other end. The film is indexed i. e. properly framed, by means of the ball and socket detent 42 which can be adjusted to properly frame the film. The friction spring 43 bears upon the collar 44 to prevent end play of the main shaft assembly, and cooperate with the ball and socket detent. The advance knob 45 is pinned to the shaft 40. It has four notches which receive the ball of detent 42.

Figure 5 shows a view of the front of the projector showing the aperture 4 past which the film goes. The sprockets 22 are mounted on the main shaft 40. The front of the casing mounts the vertical guides for the film shown in Figures 6–11. There are also horizontal slots to receive a horizontal slide holder, as shown in the dotted portion 50 of Figure 3. Figure 5 also shows a portion of the air blast conduit 3.

Referring to the vertical guide 59 of Figure 6, the film passes down between side flanges 53, 54 past the light beam aperture 55. A pair of pressure plates 60 of Figure 7 are inserted in the guide assembly of Figure 6 between the flanges 53, 54 and bearing on the spring 56. The pressure plates 60 have a corresponding aperture 55' and are preferably used without glass plates. This permits the air blast to strike the film directly and gives the maximum cooling effect. Also there will be no scratching of the film or obscuring of the image projected due to dirt on the glass. Figure 8 shows a section taken along the line 8—8 of Figure 7.

Figure 9 shows interchangable pressure plate 60' adapted for glass inserts 61. The glass 61 is preferably only used under unusually hot conditions such as larger projection lamps or with non-safety film. Figure 10 shows a section of a pair of pressure plates 60' with the glass inserts 61 and Figure 11 is a section of Figure 10 along the lines 11—11.

Therefore, the present invention provides means for cooling the film by a direct air blast in addition to the conventional means for cooling the entire projector. Many modifications may be made without departing from the true scope of the invention which includes the use of all known equivalents.

We claim:

1. A film cooling apparatus for a film projector comprising a projector light source, a light shield for said light source, a film guide assembly adapted to support the picture film in operative position in front of said light source, an air cooling turbine with a housing means behind and below said light source, air duct means connecting said air turbine and housing means to said light shield to cool said projector light source in said light shield, and an air duct means extending upwardly in a substantially straight manner from said air turbine and housing means to said film guide assembly adapted to provide an air blast directly upon said film and said film guide assembly.

2. An apparatus as set forth in claim 1, wherein said film projector further comprises film advancing apparatus associated with said film guide assembly for moving said film.

3. An apparatus as set forth in claim 1, wherein said film guide assembly includes a pair of pressure plates for slidably receiving said film, and each of said pressure plates having an aperture for transmitting light through said film.

4. An apparatus as set forth in claim 3, wherein said apertures are of rectangular configuration and adapted to expose a single frame of said film to the light and heat of said projector light source.

References Cited in the file of this patent
UNITED STATES PATENTS

| | | |
|---|---|---|
| 1,427,575 | Brenkert et al. | Aug. 29, 1922 |
| 1,584,098 | Holman | May 11, 1926 |
| 1,770,659 | Oehmichen | July 15, 1930 |
| 1,971,454 | Loomis | Aug. 28, 1934 |
| 2,029,871 | Johnson | Feb. 4, 1936 |
| 2,235,701 | Elliott et al. | Mar. 18, 1941 |
| 2,344,263 | Perkins | Mar. 14, 1944 |
| 2,413,288 | Cahill | Dec. 31, 1946 |